United States Patent [19]

Fenner

[11] Patent Number: 5,483,114
[45] Date of Patent: Jan. 9, 1996

[54] HYSTERESIS COUPLING

[75] Inventor: Christoph Fenner, Rifferswil, Switzerland

[73] Assignee: Landis & Gyr Business Support AG, Zug, Switzerland

[21] Appl. No.: 176,713

[22] Filed: Jan. 3, 1994

[30] Foreign Application Priority Data

Jan. 7, 1993 [CH] Switzerland .................. 45/93

[51] Int. Cl.$^6$ .......................... H02K 7/10; H02K 49/04; H02K 49/10
[52] U.S. Cl. .......................... 310/75 D; 310/103
[58] Field of Search .................. 310/51, 74, 75 D, 310/DIG. 2, 103; 464/29

[56] References Cited

U.S. PATENT DOCUMENTS

| | | | |
|---|---|---|---|
| Re. 30,761 | 10/1981 | Ban et al. | 310/46 |
| 2,807,734 | 9/1957 | Lelide | 310/103 |
| 3,636,277 | 1/1972 | Pohler | 310/103 |
| 4,072,874 | 2/1978 | Arnold, Jr. | 310/74 |
| 4,465,950 | 8/1984 | Güttinger | 310/162 |
| 4,535,434 | 8/1985 | Kishi | 369/266 |
| 4,597,300 | 7/1986 | Beardmore et al. | 310/51 |
| 4,825,983 | 5/1989 | Nakanishi | 310/74 |
| 5,105,928 | 4/1992 | Saeki et al. | 310/103 |
| 5,292,284 | 3/1994 | Denk et al. | 464/29 |

FOREIGN PATENT DOCUMENTS

| | | |
|---|---|---|
| 1214318 | 4/1966 | Germany . |
| 1488003 | 4/1969 | Germany . |
| 2837569 | 3/1980 | Germany . |
| 664052 | 2/1949 | Switzerland . |
| 195543 | 5/1967 | U.S.S.R. . |
| 225998 | 1/1969 | U.S.S.R. . |
| 995222 | 2/1983 | U.S.S.R. . |

*Primary Examiner*—Clayton E. LaBalle
*Attorney, Agent, or Firm*—Meltzer, Lippe, Goldstein, et al.

[57] ABSTRACT

A hysteresis coupling comprising a magnetic cylinder (1) made of a permanent-magnetic material and a thrust ring (4) made of a hysteresis material. The thrust ring (4) is fixedly connected to a thrust ring holder (5) and separated from the magnetic cylinder (1) by an air gap (3). The hysteresis coupling transmits the torque from a drive (7) to a pinion (9) which is part of the thrust ring holder (5). The thrust ring (4) is surrounded on its outside by non-magnetic material of high density in order to increase the moment of inertia (5) for noise reduction.

7 Claims, 1 Drawing Sheet

HYSTERESIS COUPLING

BACKGROUND OF THE INVENTION

The instant invention relates to a hysteresis coupling having a magnetic cylinder made of a permanent magnetic material and a thrust ring made of a hysteresis material. The thrust ring is connected to a thrust ring holder and separated from the magnetic cylinder by an air gap.

Hysteresis couplings can be used, for example, to limit the torque in a drive and to actuate actuating drives used for rotary valves and ventilation flaps, etc.

A hysteresis coupling equipped with a magnetic cylinder and a thrust ring separated from the magnetic cylinder by an air gap is known from CH PS 664052. This patent discloses how to operate and size the parts of a hysteresis coupling for a predetermined torque. At high rotational speeds the disclosed hysteresis coupling produces a noise which is often annoying when used in a residential area.

SUMMARY OF THE INVENTION

The object of the present invention is to improve the hysteresis coupling so that the transmission of the torque involves little noise.

The present invention achieves this object with a hysteresis coupling comprising a magnetic cylinder made of a permanently magnetic material and a thrust ring made of a hysteresis material fixedly connected to a thrust ring holder. The thrust ring and holder are separated from the magnetic cylinder by an air gap. Non-magnetic material surrounds the thrust ring and is fixedly connected to said thrust ring holder. This material increases the moment of inertia of the thrust ring holder.

DETAILED DESCRIPTION OF THE INVENTION

Figure 1:
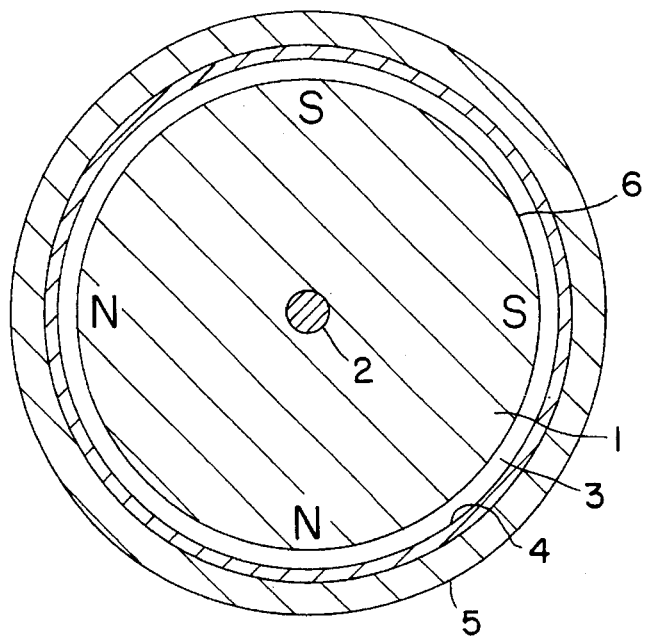
FIG. 1 illustrates a hysteresis coupling according to the invention.

Referring to FIG. 1, a hysteresis coupling comprising a cylindrical magnetic cylinder 1 made of a permanently magnetic material, an axle 2, an air gap 3, a tubular thrust ring 4 made of a ferrimagnetic or ferromagnetic material, the hysteresis material and a thrust ring holder 5 is shown. The magnetic cylinder 1 and the thrust ring holder 5 with the thrust ring 4 all rotate around the common axle 2. The magnetic cylinder 1 can be provided on its cylinder surface 6 with two pairs of magnetic poles, e.g., N-S. These poles are distributed evenly over the circumference and separated from the thrust ring 4 by the air gap 3. The magnetic field lines emerge at each north pole N from the magnetic cylinder 1 and bridge the air gap 3. They are guided through the thrust ring 4 to the nearest south pole S and, after overcoming the air gap, enter at the south pole S. The magnetic field lines enter the magnetic cylinder 1 again where they close. The material of the thrust ring 4 is magnetized on the two sections between the north and the south poles. The north and south poles on the circumference of the cylinder surface 6 are penetrated at identical intervals and alternately by the magnetic field while the thrust ring 4 is penetrated uniformly by the magnetic field. The present invention is not limited to this method of magnetization. Other forms of magnetization of magnetic cylinder 1 can be used.

Figure 2:
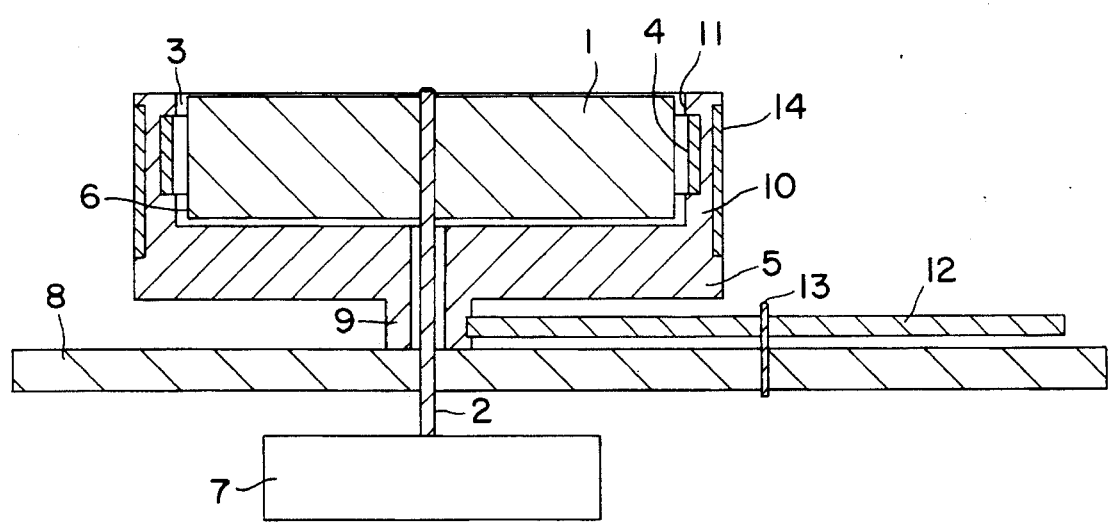
FIG. 2 illustrates a drive with the hysteresis coupling.

Referring to FIG. 2, an example of a drive unit with the hysteresis coupling is given. The plane of the drawing shows axle 2. A drive 7, e.g., an electric motor, is installed on one side of a flat bar 8. The drive axle of drive 7 is fixedly connected to the rotatable axle 2 which goes through the flat bar 8. The thrust ring holder 5 is set on the other side of the flat bar 8 and is able to rotate freely. The axis of rotation of the dynamically balanced thrust ring holder 5 and the axle 2 coincide.

The thrust ring holder 5 is made of a non-magnetic material, preferably a synthetic material, which can be milled at low cost. The thrust ring holder 5 is provided with a pedestal made in the form of a pinion 9 which rotatably supports the thrust ring holder 5 against the flat bar 7. On the other side of the pinion 9 the thrust ring holder 5 widens into a plate shape and together with a wall 10 constitutes a pot-shaped recess centered on axle 2. This recess receives the magnetic cylinder 1 which is fixedly mounted on axle 2. The recess is surrounded by the tubular wall 10. The thrust ring 4 is fixedly connected to the thrust ring holder 5 on the inside surface 11 of the wall 10. The thrust ring 4 is, therefore, unable to execute any movement in relation to the thrust ring holder 5. The air gap 3 remains between the thrust ring 4 and the cylinder surface 6.

A toothed wheel 12 or gear, which rotates around a swivelling axis 13, engages the pinion 9. The toothed wheel 12 is part of an actuating drive, not shown here, whose output shaft may be used for direct actuation of a control or regulation system, as well as other types of systems. Rotary valves, mixing valves, and ventilation flaps are examples of such regulation systems.

Drive 7 drives the magnetic cylinder 1 via the axle 2. The magnetic cylinder 1 is able to drive the thrust ring holder 5 up to a predetermined torque by means of its magnetic fields. These fields extend over the thrust ring 4, since the thrust ring 4 moves out of the way to avoid reversal of the magnetization of its material. The rotation of the thrust ring 4 is transmitted to the thrust ring holder 5 whose pinion 9 retransmits the torque to the toothed wheel 12 of the actuating drive. If the actuating drive axle reaches one of its two end positions as defined by the control system, the torque required for further rotation of the thrust ring holder 5 increases sharply. This increase occurs until the magnetic fields of the magnetic cylinder 1 are no longer able to transmit the torque in the hysteresis coupling. Instead the fields reverse the magnetization of the magnetic material of the thrust ring 4.

According to the above-mentioned patent CH PS 664,052, a) the generating lines on the cylinder surface 6 are only insignificantly longer than the generating lines of the thrust ring 4, and b) the torque which can be transmitted from the hysteresis coupling is directly proportional to the volume of thrust ring 4 which is filled with magnetic material.

Since actuating drives must often deliver high starting torques, a correspondingly high reduction is required for the gearing in order to reduce the torque for the hysteresis coupling to a transmissible level. The space destined for the hysteresis coupling and, thereby, the achievable torque are limited. Therefore, the rotational speed of axle 2 at which the magnetic cylinder 1 and the thrust ring holder 5 with the thrust ring 4 must be increased, in order to open or close the control system within a predetermined period of time.

To be able to rotate freely, the thrust ring holder 5 must have bearing clearance on axle 2. The position of thrust ring holder 5 is not stable in relation to axle 2 because of the magnetic forces between the magnetic cylinder 1 and the thrust ring 4. Therefore, inequalities of the torque caused by the gearing received at the pinion 9 impart a wobbling rotation to the thrust ring holder 5, which causes the annoying noise. It has been shown that by increasing the moment of inertia of the thrust ring holder 5 this wobble can be reduced and the noise is advantageously reduced and no longer has an annoying effect.

The augmentation of the moment of inertia can be achieved easily if the thrust ring holder 5 is made of a non-magnetic material, e.g., of sintered tungsten metal or brass. Such a material has considerably higher density than the synthetic materials.

Only the masses in wall 10 of the thrust ring holder 5, far away from the axle 2, contribute substantially to the moment of inertia. A radial enlargement of the thrust ring would provide the augmentation of the moment of inertia which is required to reduce noise, but must be eliminated since the transmissible torque of the hysteresis coupling would otherwise increase beyond an acceptable value. This value is determined by the design of the gearing and the control or regulation system. When this value is exceeded the gearing, as well as the control or regulation system, may be damaged.

For this reason it is advantageous to make the entire wall 10, or at least part of its thickness, out of a non-magnetic material having a greater density than that of a synthetic material. The non-magnetic material surrounds the thrust ring 4 on all sides so that the axle 2 and the axial center of gravity line of the entire thrust ring holder 5 remain coincidental with the thrust ring holder 5 and the ring 14.

The non-magnetic dense material can be a compound material. The wall 10 or the entire thrust ring holder 5 is made of this material. Many needles of a denser material can be embedded in the wall 10, parallel to the axle, to increase the moment of inertia. In the alternative, a ring shape of a compound material can be formed for wall 10 which contains particles of non-magnetic material of high density, e.g. tungsten, embedded in the synthetic material. The ring form bears the thrust ring 4 on the inside 11 and is firmly combined in the wall 10 with the plate-shaped part of the thrust ring holder 5.

In another alternative, the non-magnetic material in the form of a brass or copper pipe section, designated as ring 14, is installed concentrically to the thrust ring 4 and is attached on the thrust ring holder 5. Such a ring 14 is simpler to manufacture then the needles.

Assembly is especially simple if the ring 14 is cut open along one of its generating lines. Ring 14 can be snapped on the wall 10 and fixed in a groove-shaped recess made in the outside side of wall 10.

While the invention has been described by reference to specific embodiments, this was for the purpose of illustration only. Numerous alternative embodiments will be apparent to those skilled in the art, and are considered to be within the spirit and scope of the invention.

I claim:

1. A hysteresis coupling for transferring a predetermined torque of a drive to an output device, comprising, a magnetic cylinder made of a permanently magnetic material and fixedly connected to the drive by a common axis, a thrust ring made of a hysteresis material and fixedly connected to a thrust ring holder, said thrust ring and thrust ring holder separated from said magnetic cylinder by an air gap, and a non-magnetic material of high density surrounding said thrust ring and fixedly connected to said thrust ring holder, said non-magnetic material increasing the moment of inertia of said thrust ring holder and rotating freely on said common axis.

2. A hysteresis coupling for transferring a predetermined torque of a drive to an output device, comprising a magnetic cylinder made of a permanently magnetic material and fixedly connected to the drive by a common axis, a thrust ring made of a hysteresis material and fixedly connected to a thrust ring holder, said thrust ring and thrust ring holder separated from said magnetic cylinder by an air gap, a non-magnetic material of high density surrounding said thrust ring and fixedly connected to said thrust ring holder, said non-magnetic material increasing the moment of inertia of said thrust ring holder and rotating freely on said common axis, and said thrust ring holder including a pinion which engages with said output device for transferring the torque to said output device.

3. The hysteresis coupling of claim 2 wherein said output device comprises a toothed wheel.

4. The hysteresis coupling of claim 2 wherein said non-magnetic material is in the form of a ring and is part of said thrust ring holder.

5. The hysteresis coupling of claim 4 wherein said ring of non-magnetic material is located on an outer cylindrical side of said thrust ring holder.

6. The hysteresis coupling of claim 5 wherein said thrust ring holder is made from a synthetic material and a non-magnetic material of high density.

7. The hysteresis coupling of claim 5 wherein said non-magnetic material is brass or copper.

* * * * *